(12) United States Patent
Enjalbert et al.

(10) Patent No.: US 8,018,200 B2
(45) Date of Patent: Sep. 13, 2011

(54) CONTROL APPARATUS AND METHOD OF REGULATING POWER

(75) Inventors: Jerome Enjalbert, Toulouse (FR); Olivier Tico, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 1045 days.

(21) Appl. No.: 11/816,040

(22) PCT Filed: Feb. 22, 2005

(86) PCT No.: PCT/IB2005/000819
§ 371 (c)(1),
(2), (4) Date: Aug. 10, 2007

(87) PCT Pub. No.: WO2006/090203
PCT Pub. Date: Aug. 31, 2006

(65) Prior Publication Data
US 2008/0094037 A1    Apr. 24, 2008

(51) Int. Cl.
*H02J 7/00* (2006.01)
*G05F 1/00* (2006.01)

(52) U.S. Cl. .................... 320/134; 320/136; 323/273

(58) Field of Classification Search .............. 320/134, 320/163, 135, 136, 150, 153; 323/273–276
See application file for complete search history.

(56) References Cited

U.S. PATENT DOCUMENTS

| | | | |
|---|---|---|---|
| 4,937,697 A * | 6/1990 | Edwards et al. | ................. 361/18 |
| 5,998,966 A | 12/1999 | Gaza | |
| 6,087,810 A | 7/2000 | Yoshida | |
| 6,144,187 A | 11/2000 | Bryson | |
| 6,522,118 B1 | 2/2003 | Barcelo et al. | |
| 6,667,606 B2 * | 12/2003 | Oglesbee et al. | ............. 323/284 |
| 6,771,051 B2 * | 8/2004 | Oglesbee et al. | ............. 320/150 |
| 6,850,040 B2 * | 2/2005 | Xiong et al. | ................. 320/134 |

FOREIGN PATENT DOCUMENTS

WO    0245237 A2    6/2002

\* cited by examiner

*Primary Examiner* — Richard V Muralidar (57) ABSTRACT

In the field of battery charging for electronic devices, it is known to employ a number of measures to avoid excessive power dissipation by a pass device in a charging system. However, many of these measures are either incompatible with linear charging regimes or add cost to the adapter and/or charging system. The present invention provides a power dissipation measurement circuit for controlling a control device that acts in series with another, but maximum current limiting, control device to control drive current to the pass device so as to limit the power dissipated by the pass device to a maximum threshold value.

18 Claims, 6 Drawing Sheets

CONTROL APPARATUS AND METHOD OF REGULATING POWER

FIELD OF THE INVENTION

This invention relates to a control apparatus of the type, for example, used to regulate power dissipation by a pass device coupled between a power supply and a load, such as a cell to be charged. The present invention also relates to a method of regulating power in a circuit comprising a pass device for coupling a power supply to a load, such as a cell to be charged.

BACKGROUND OF THE INVENTION

Rechargeable cells are now in widespread use in many applications. Electronic and, particularly portable electronic, devices ranging from cellular telephone handsets to digital cameras rely heavily upon high-quality rechargeable cells.

In relation to an electronic device having, for example, wireless communications capabilities, the electronic device is typically fitted with an internal charging system to charge a main battery also fitted in the electronic device. The charging system has a pass device designed to be coupled between an external power transformer (hereinafter referred to as an "adapter") and the battery. However, the widespread availability of third party, and sometimes "pirate", adapters causes safety concerns for manufacturers of the electronic devices due to the sometimes incompatible output of the adapters. One of these concerns relates to power dissipated by the pass device where the adapter is supplying more power than the power rating of the pass device. Under such conditions, the pass device can be damaged, fail completely, or at the very least the useful lifetime of the pass device can be curtailed; the battery may even become dangerous.

Typically, adapters are designed either for coupling to a wall-mounted power outlet or a cigarette/cigar lighter in a vehicle, such as an automobile. Further, modern adapters are expected to be useable in a number of different countries having differing mains voltage supplies. Therefore, due to these performance demands, some manufacturers of adapters have chosen design alternatives to ensure that only genuine Original Equipment Manufacturer (OEM) adapters are used with the electronic devices, thereby attempting to obviate or at least mitigate against potential harm to charging systems, batteries and/or users. In this respect, manufacturers have designed adapters having low regulated output voltages, and have tried to encourage use of such adapters by providing the adapters with bespoke connector arrangements to couple an adapter to the electronic device. However, whilst such arrangements reduce connection flexibility in a positive way to encourage use of safe OEM adapters, the arrangements increase cost of the electronic device and the handset.

Another approach employs external protective measures. For example, the electronic device can be fitted with a fuse. However, the provision of the fuse increases the cost of the electronic device and cannot be re-used once the fuse has melted or otherwise become disabled and hence the charging system is disabled. Another measure is to provide the charging system with a temperature shutdown circuit, for example a circuit comprising an internal pass device protected by a thermal regulation loop that also maximises charge rate of the charging system, as described in U.S. Pat. No. 6,521,118. However, such a solution is unattractive for the following reasons. Firstly, the circuit describes in U.S. Pat. No. 6,521,118 is not designed to operate with charging systems that employ a pass device external to the adapter. Secondly, the circuit of U.S. Pat. No. 6,521,118 would increase the cost of the electronic device, because it cannot be integrated into a larger power management chip due to the high heat dissipation of the circuit. Consequently, the chip count in the electronic device increases, making the circuit economically incompatible with a low cost charging arrangement. Further, additional internal power dissipation of the circuit is incompatible with disposal of the circuit in a fully integrated power management circuit.

Another technique for coping with excessive power dissipation by the pass device is to use pass devices with higher power dissipation capability. However, higher power rated pass devices require a larger physical package than their lower power rated counterparts and so occupy more circuit board space; they also increase the cost of the electronic device and so are an undesirable solution.

Another known charging system is disclosed in U.S. Pat. No. 6,144,187 and uses an analogue multiplier to calculate an AC adapter input power. A control loop limits the power supplied by the AC adapter, but is more expensive to produce than linear charging systems for electronic devices. Consequently, the above described circuit does not provide protection for pass devices in linear charge applications. Additionally, this circuit limits the amount of power available to charge the battery.

STATEMENT OF INVENTION

According to the present invention, there is provided a control apparatus and a method of regulating power as set forth in the appended claims.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Throughout the following description identical reference numerals will be used to identify like parts.

Figure 1:
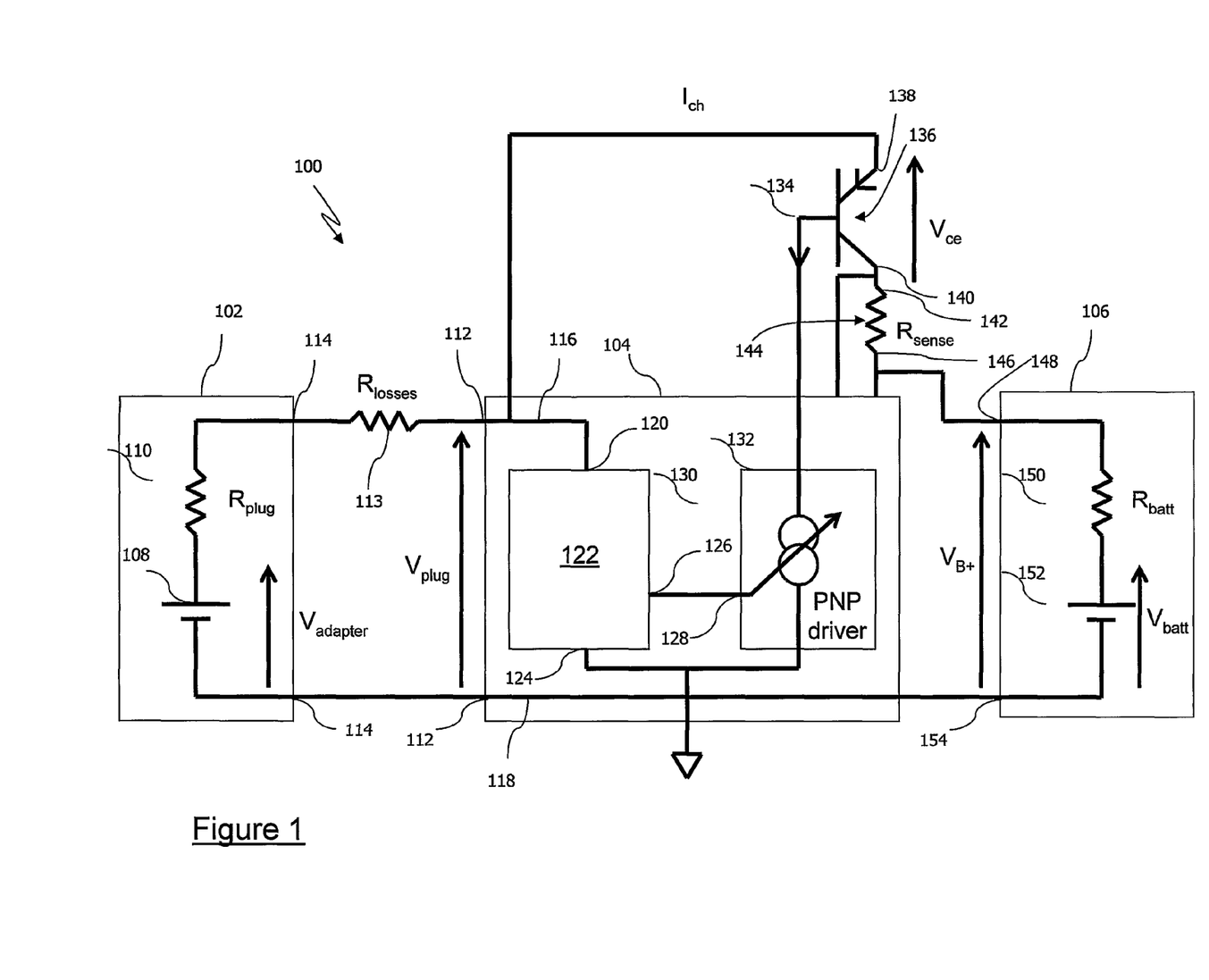
FIG. 1 is a schematic diagram, in overview, of a circuit comprising a power regulation apparatus constituting an embodiment of the invention.

Referring to FIG. 1, a charging arrangement 100 comprises an adapter 102 coupled to a charging system 104, the charging system 104 being coupled to a cell, for example, a battery 106. The adapter 102 can be represented as a voltage source 108 coupled in series to an equivalent internal resistance 110 of the adapter 102, including the resistive contribution by an electrical plug (not shown) attached to the adapter 102.

The charging system 104 is external to the adapter 102 and is disposed within an electronic device (not shown), for example a wireless communications device, such as a cellular telephone handset. The charging system has an input terminal 112 coupled to an output terminal 114 of the adapter 102, for example by a two-core cable (not shown) and a pair of connectors (also not shown). The two-core cable has a positive voltage wire and a ground, or earth, wire. The input terminal 112 of the charging system 104 comprises a positive power supply rail 116 and a ground rail 118, the positive supply rail 116 being coupled to the positive voltage wire and the ground rail 118 being coupled to the ground wire. In this example, the resistive losses of the cable are represented by a resistive loss 113.

The positive power supply rail 116 is coupled to an input 120 of a controller 122, and a first output terminal 124 of the controller 122 is coupled to the ground rail 118. A second output terminal 126 of the controller 122 is coupled to an input terminal 128 of a controlled current source 130.

A control terminal 132 of the drive current source 130 is coupled to a control terminal 134 of a pass device 136, a second input terminal 138 of the pass device 136 being coupled to the positive supply rail 116. The pass device 136 is independent from the adapter 102. An output terminal 140 of the pass device 136 is coupled directly to the charging system 104 and also to a first terminal 142 of an external, sensing, resistor 144, a second terminal 146 of the external sensing resistor 144 also being coupled to the charging system 104. The exact coupling between the pass device 136 and the charging system 104 is described in greater later herein. The pass device 136 is any suitable device capable of setting and modifying the flow of a charge current, $I_{ch}$, to the battery 106. In this example, the pass device 136 is a bipolar PNP transistor, but the skilled person will appreciate that other devices can be employed.

The second terminal 146 of the sensing resistor 144 is also coupled to a positive voltage terminal 148 of the battery 106, the battery 106 being characterised as comprising an equivalent internal resistance 150 of the battery coupled to at least one cell 152. The positive voltage terminal 148 of the battery 106 is coupled to the internal resistance 150, the internal resistance 150, as explained above, being coupled to the at least one cell 152. The at least one cell 152 is coupled to a ground terminal 154 of the battery 106, the ground terminal 154 of the battery 106 being coupled the ground rail 118 of the charging system 104.

Figure 2:
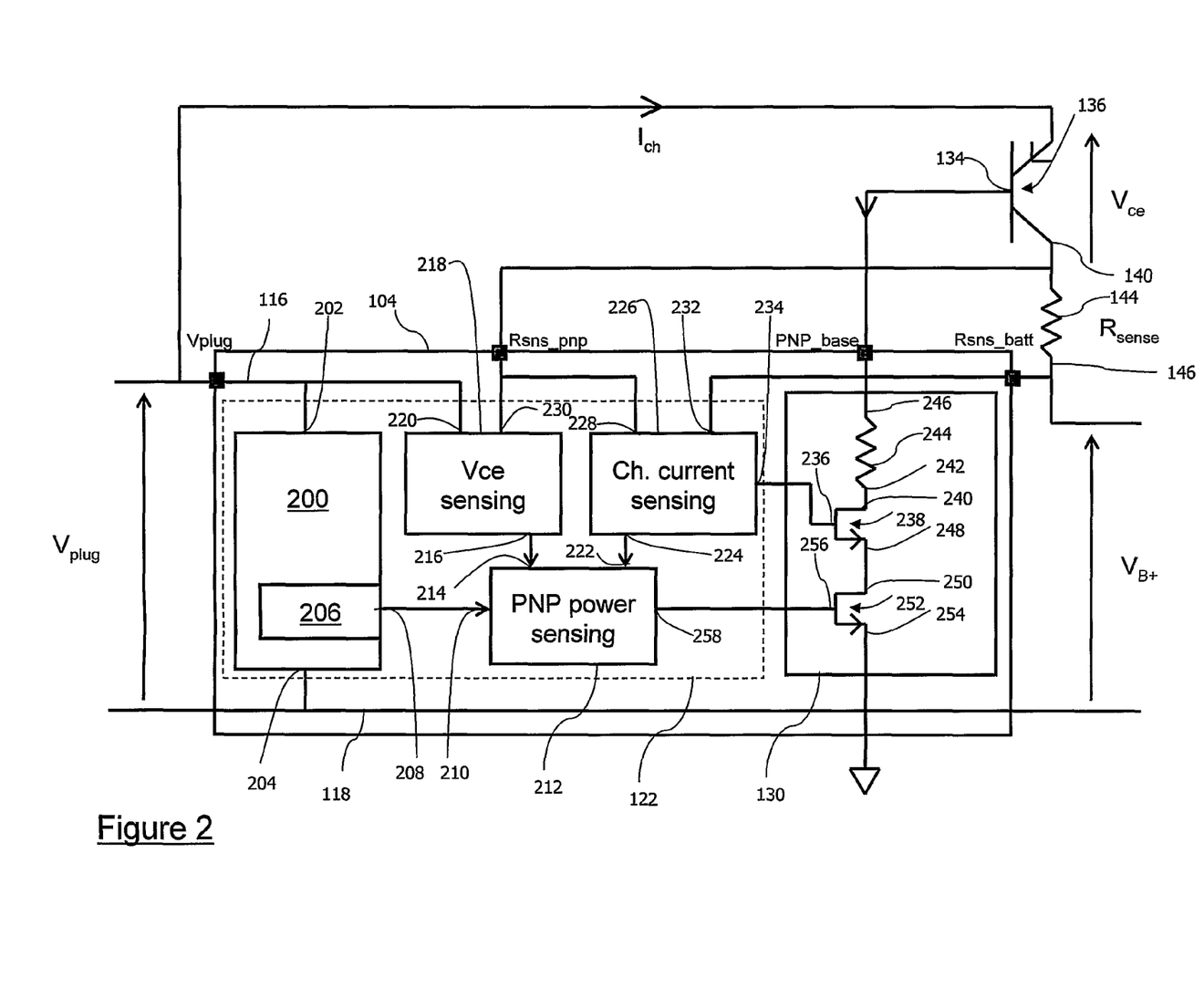
FIG. 2 is a schematic diagram of, inter alia, the power regulation apparatus of FIG. 1, the power regulation apparatus being shown in greater detail.

Turning to FIG. 2, the controller 122 comprises a control unit 200 having a first terminal 202 thereof coupled to the positive supply rail 116 and a second terminal 204 thereof coupled to the ground rail 118. The control unit 200 comprises a counter 206 having an output (not shown) coupled to an output terminal 208 of the control unit 200. The output terminal 208 of the control unit 200 is coupled to a first terminal 210 of a power sensing circuit 212. A second terminal 214 of the power sensing circuit 212 is coupled to a first terminal 216 of a differential voltage sensing circuit 218, a second terminal 220 of the differential voltage sensing circuit 218 being coupled to the positive supply rail 116. A third terminal 222 of the power sensing circuit 212 is also coupled to a first terminal 224 of a charge current sensing circuit 226, a second terminal 228 of the charge current sensing circuit 226 being coupled to a third terminal 230 of the differential voltage sensing circuit 218 and the output terminal 140 of the pass device 136.

A third terminal 232 of the charge current sensing circuit 226 is coupled to the second terminal 146 of the sensing resistor 144, and a fourth terminal 234 of the charge current sensing circuit 226 is coupled to a gate terminal 236 of a first N-channel Metal Oxide Semiconductor (NMOS) Field Effect Transistor (FET) 238 of the drive current source 130. A drain terminal 240 of the first NMOS FET 238 is coupled to a first terminal 242 of a first load resistor 244, a second terminal 246 of the first load resistor 244 being coupled to the first input terminal 134 of the pass device 136. The first load resistor 244 provides additional protection to base of the PNP bipolar transistor that serves as the pass device 136.

A source terminal 248 of the first NMOS FET 238 is coupled to a drain terminal 250 of a second NMOS FET 252, a source terminal 254 of the second NMOS FET 252 being coupled to the ground rail 118. A gate terminal 256 of the second NMOS FET 252 is coupled to a fourth terminal 258 of the power sensing circuit 212.

Figure 3:
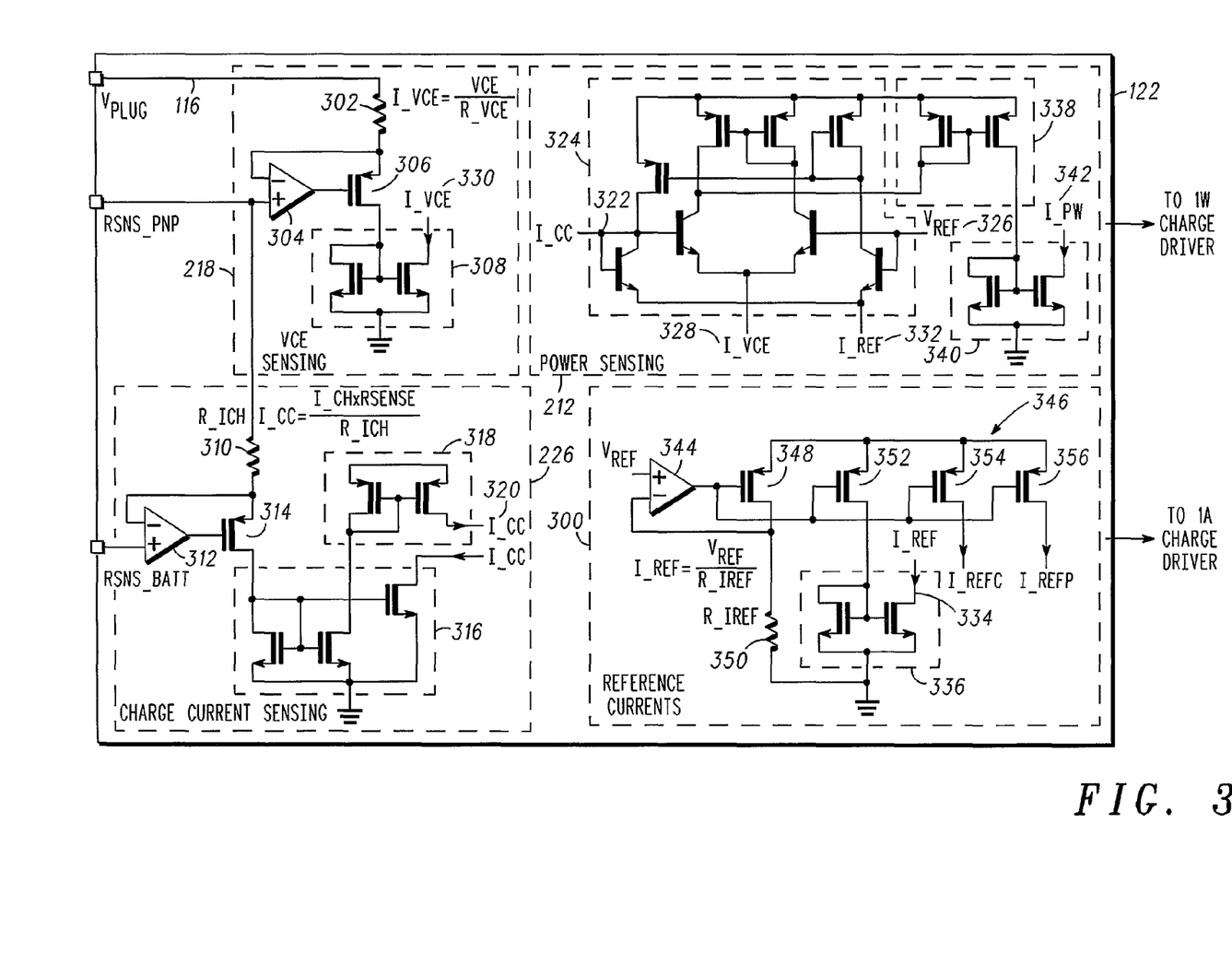
FIG. 3 is a schematic diagram of the power regulation apparatus in FIG. 2, but in further detail.

Referring to FIG. 3, the controller 122 comprises the differential voltage sensing circuit 218, the charge current sensing circuit 226 and the power sensing circuit 212. Although not shown in FIGS. 1 and 2, the controller 122 also comprises a reference current generation circuit 300.

The differential voltage sensing circuit 218 comprises an integrated sensing resistor $R_{vce}$ 302 coupled to the positive power rail 116 and an inverting input terminal of a first operational amplifier 304 and a source terminal of a first P-channel Metal Oxide Semiconductor (PMOS) FET 306. A gate terminal of the first PMOS FET 306 is coupled to an output terminal of the operational amplifier 304. The non-inverting input terminal of the first operational amplifier 304 is coupled to the output terminal 140 of the pass device 136. The drain terminal of the first PMOS FET 306 is coupled to a current mirror arrangement 308. Together, the integrated sensing resistor 302, the first operational amplifier 304, the first PMOS FET 306 and the current mirror arrangement 308 serve as a current source circuit for generating a first sensing current, $I_{vce}$, proportional to the collector-emitter voltage, $V_{ce}$, of the pass device 136.

The non-inverting input terminal of the first operational amplifier 304 is also coupled to a third sensing resistor 310, the third sensing resistor 310 also being coupled to an inverting input terminal of a second operational amplifier 312 and a source terminal of a second PMOS FET 314. A gate terminal of the second PMOS FET 314 is coupled to an output terminal of the second operational amplifier 312, and the drain terminal of the second PMOS FET 314 is coupled to a second current mirror arrangement 316. The second current mirror arrangement 316 is coupled to a third current mirror arrangement 318. A non-inverting input terminal of the second operational amplifier 312 is coupled to the positive voltage terminal 148 of the battery 106. Together, the third sensing resistor 310, the second PMOS FET 314, the second operational amplifier 312, and the second and third current mirror arrangements 316, 318 serve as a second current source circuit for generating a second sensing current, $I_{cc}$, that is proportional to the current flowing through the pass device 136, i.e. the charging current, $I_{ch}$, and is used to limit the charge current.

A source terminal 320 of the third current mirror arrangement 318 is coupled to a first terminal 322 of a Gilbert Cell arrangement 324. The Gilbert Cell arrangement 324 comprises a number of PMOS FETs and NPN bipolar transistors, the arrangement of which is known to the skilled person and so for the sake of conciseness will not be described further herein.

A second terminal 326 of the Gilbert Cell arrangement 324 is coupled to a source of a reference voltage $V_{ref}$ (not shown). A third terminal 328 of the Gilbert Cell arrangement 324 is coupled to a drain terminal 330 of the first current mirror arrangement 308, and a fourth terminal 332 of the Gilbert Cell arrangement 324 is coupled to a drain terminal 334 of a fourth current mirror arrangement 336 of the reference current generation circuit 300. The Gilbert Cell arrangement 324 is coupled to a fifth current mirror arrangement 338, the fifth current mirror arrangement 338 being coupled to a sixth current mirror arrangement 340. A drain terminal 342 of the sixth current mirror arrangement 340 provides a third sensing current, $I_{pw}$, that is proportional to a power dissipated, $P_d$, by the pass device 136.

The reference current generation circuit 300 comprises a third operational amplifier 344 having a non-inverting input terminal coupled to the source of the reference voltage, $V_{ref}$. Although not shown in the Figures, the circuit that generates the reference voltage, $V_{ref}$, is a known standard feature of integrated circuits and routinely designed into the integrated circuits for use by a number of circuits making up the integrated circuit. Typically, the reference voltage, $V_{ref}$, is a voltage that is stable with respect to temperature and manufacturing process variations. An array of PMOS FETs 346 are coupled in parallel having their gate terminals coupled to an output terminal of the operational amplifier 344, an inverting input terminal and a drain terminal of a first PMOS FET 348 of the array of PMOS FETs 346 being coupled to the ground rail 118 via a reference resistor 350. A drain terminal of a second PMOS FET 352 of the array of PMOS FETs 346 is coupled to the fourth current mirror arrangement 336. Together, the third operational amplifier 344, the array of PMOS FETs 346, the reference resistor 350 and the fourth current mirror arrangement 336 serve as a current source for generating reference currents, a first reference current, $I_{ref}$, being provided at the drain terminal 334 of the fourth current mirror arrangement 336, a second, threshold reference charging, current, $I_{refc}$, being provided at a drain terminal of a third PMOS FET 354 of the array of PMOS FETs 346, and a third, threshold power reference, current, $I_{refp}$, being provided at a drain terminal of a fourth PMOS FET 356 of the array of PMOS FETs 346.

In operation, the adapter 102 is plugged into a power outlet as well as connected to the electronic device, thereby coupling the adapter 102 to the charging system 104. The battery 106 is, of course, also coupled to the charging system 104 in the manner already described above.

Upon powering up the charging system 104, the reference voltage, $V_{ref}$, is supplied to the reference current generation circuit 300, causing the current source circuit therein to generate the first, second and third reference currents $I_{ref}$, $I_{refc}$, $I_{refp}$. The reference resistor 350 is set such that the threshold reference charging current, $I_{refc}$, corresponds to a predetermined maximum threshold current that is permitted to flow through the pass device 136 and the battery 106 when the battery is being charged. In this example, the threshold reference charging current, $I_{refc}$, corresponds to a maximum charging current of 1 A. Similarly, the setting of the reference resistor 350 also ensures that the threshold power reference current, $I_{refp}$, corresponds to a maximum permitted power dissipation by the pass device 136 of 1 W.

At the same time, the current source of the differential voltage sensing circuit 218 translates the voltage applied across the positive power rail 116 and the non-inverting input terminal of the first operational amplifier 304 into the first sensing current $I_{vce}$. The voltage across the positive power rail 116 and the non-inverting input terminal of the first operational amplifier 304, is the collector-emitter voltage, $V_{ce}$, of the pass device 136 and so the second sensing current $I_{vce}$ is proportional to the collector-emitter voltage, $V_{ce}$, of the pass device 136. Additionally, a voltage across the first sensing resistor 144 is applied across the non-inverting input terminal of the first operational amplifier 304 and the non-inverting input terminal of the second operational amplifier 312. The voltage across the first sensing resistor 144 is translated by the current source circuit of the charging current sensing circuit 226 into the second sensing current, $I_{cc}$. As already mentioned above, the second sensing current, $I_{cc}$, is proportional to the current flowing though the pass device 136, corresponding to the charging current, $I_{ch}$, of the charging system 104. The charging system 104 therefore has a measure of the charging current, $I_{ch}$, and the collector emitter voltage, $V_{ce}$, of the pass device 136.

The Gilbert Cell arrangement 324, being a cross coupled differential amplifier, multiplies the value of the second sensing current, $I_{cc}$, which is proportional to the charging current, $I_{ch}$, by the first sensing current, $I_{vce}$, which is proportional to the collector-emitter voltage, $V_{ce}$, to arrive at a power dissipated sensing current, $I_{pw}$, that is proportional to the power dissipated, $P_d$, by the pass device 136. The reference voltage, $V_{ref}$, serves to set a correct operating point for the Gilbert cell arrangement 324, and the first reference current, $I_{ref}$, serves to provide a scaling factor for the third sensing current, $I_{pw}$, i.e. $I_{pw} = (I_{vce} \times I_{cc})/I_{ref}$.

Knowledge of the charge current, $I_{ch}$, is used in combination with the threshold reference charge current, $I_{refc}$, to control the first NMOS FET 238. In series with the first NMOS FET 238, the second NMOS FET 252 is controlled by the power dissipation sensing current, $I_{pw}$, in combination with the threshold power reference current, $I_{refp}$, thereby providing independent control of the current flowing through the pass device 136 and hence the charging current, $I_{ch}$.

Figure 4:
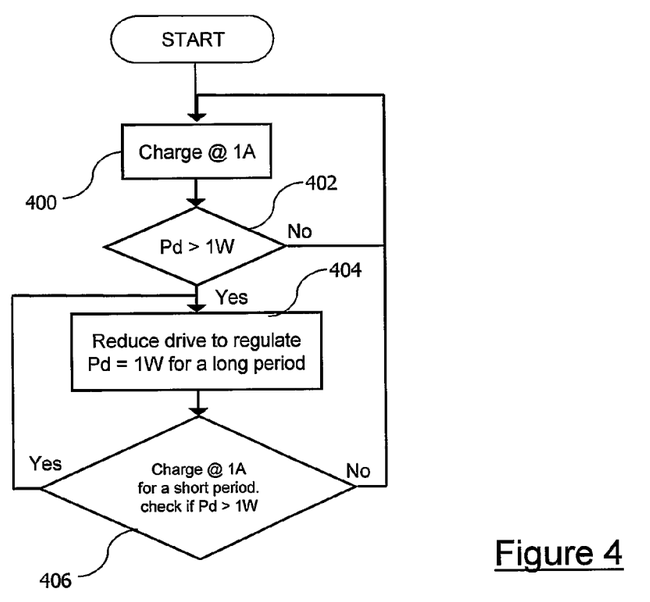
FIG. 4 is a flow diagram of the operation, in overview, of the apparatus of FIG. 3.
Figure 5:
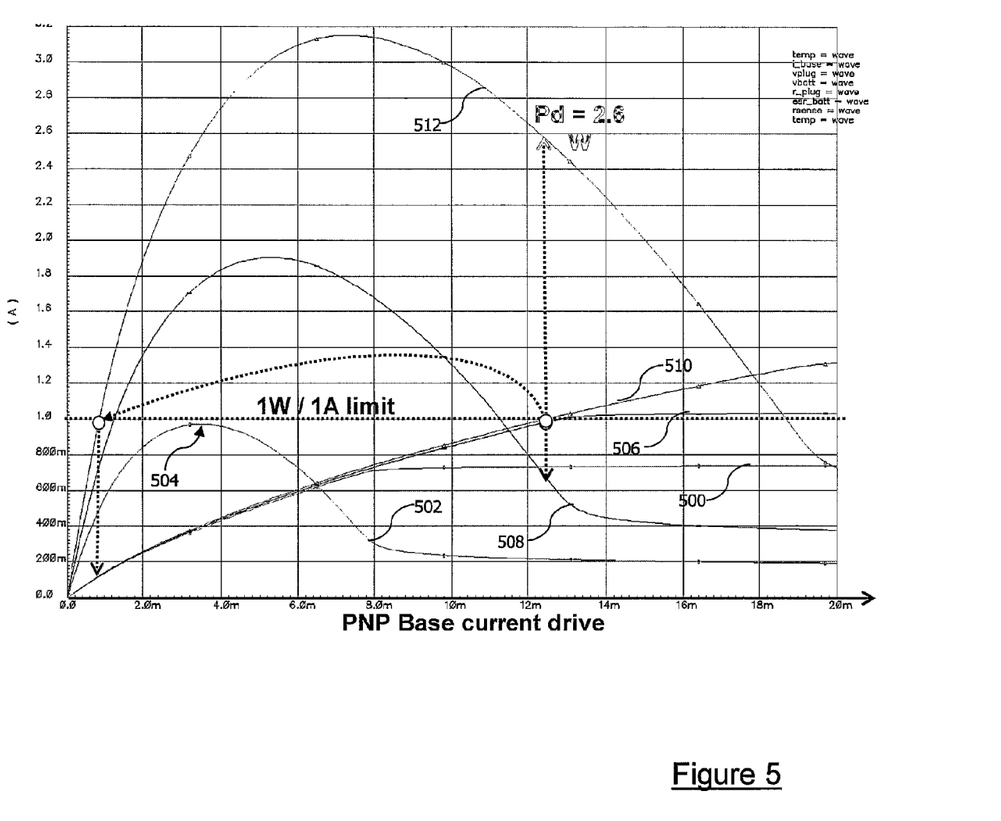
FIG. 5 is a graph of power dissipation curves and charging current curves in respect of three different voltage sources used at a first time.
Figure 7:
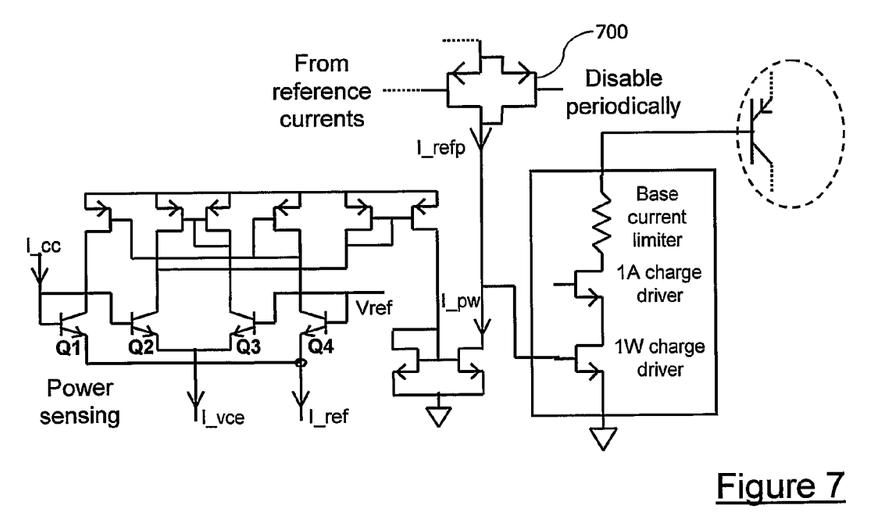
FIG. 7 is a schematic diagram of part of the power regulation apparatus of FIG. 3.

Turning to FIGS. 4 and 5, in a first example of the adapter 102, the supply rail 116 is at 8V, the resistance $R_{plug}$ of the adapter 102 is 6Ω and the initial charge voltage across the battery 106 is 3V. These initial parameters result in a first charging current curve 500 and a first power dissipation curve 502 for the power $P_d$ dissipated by the pass device 136. In this first example, the threshold reference charge current, $I_{refc}$, and the second sensing current, $I_{cc}$, flow in opposite directions resulting in a first error signal, $I_{refc}-I_{cc}$, the first error signal serving as a control signal for the first NMOS FET 238 being amplified by the transconductance of the first NMOS FET 238 to act as a first control of a drive current for the pass device 136. Similarly, and referring to FIG. 7, the threshold power reference current, $I_{refp}$, and the power dissipation sensing current, $I_{pw}$, flow in opposite directions resulting in a second error signal, $I_{refp}-I_{pw}$, the second error signal serving as a control signal for the second PMOS FET 252 being amplified by the transconductance of the second NMOS FET 252 to act as a second control of the drive current for the pass device 136.

Consequently, as the drive current increases, the power dissipated, $P_d$, by the pass device 136 increases until it reaches a first peak 504 of about 950 mW. Thereafter, as the drive current is further increased, the power dissipated by the pass device 136 reduces to about 200 mW. As a result, the first error signal does not reach a level (Step 400) sufficient to cause the first NMOS FET 238 to limit the drive current so as to limit the charging current flowing through the pass device 136 to the first predetermined threshold current of 1 A. Similarly, the second error signal does not reach a level (Step 402) sufficient to cause the second NMOS FET 252 to limit the drive current so as to limit the power dissipated, $P_d$, by the pass device 136 to the second predetermined threshold power dissipation of 1 W.

In a second example of the adapter 102, the supply rail 116 is at 10V, the resistance $R_{plug}$ of the adapter 102 is 6Ω and the initial charge voltage across the battery 106 is 3V. These initial parameters result in a second charging current curve 506 and a second power dissipation curve 508 for the power, $P_d$, dissipated by the pass device 136. However, as the current flowing through the pass device 136 increases to 1 A, the first error signal begins to reach the level (Step 400) mentioned above that is sufficient to cause the first NMOS FET 238 to limit the drive current, thereby limiting the charging current, $I_{ch}$, flowing through the pass device 136 to no more than the first predetermined threshold current of 1 A. Since the power dissipated, $P_d$, by the pass device 136, when the first error signal dictates the charging current to be a maximum of 1 A, is less than the predetermined threshold power dissipation of 1 W, the second error signal does not reach the level (Step 402) sufficient to cause the second NMOS FET 252 to limit the drive current; the power dissipated, $P_d$, by the pass device 136, when 1 A flows through the pass device 136, is about 700 mW.

In a third example of the adapter 102, the supply rail 116 is at 12V, the resistance $R_{plug}$ of the adapter 102 is 6Ω and the initial charge voltage across the battery 106 is 3V. These initial parameters result in a third charging current curve 510 and a third power dissipation curve 512 for the power, $P_d$, dissipated by the pass device 136. However, as the current flowing through the pass device 136 increases to 1 A, the first error signal begins to reach the level (Step 400) mentioned above that is sufficient to cause the first NMOS FET 238 to limit the drive current, thereby limiting the charging current flowing through the pass device 136 to no more than the first predetermined threshold current of 1 A. However, at the limited charging current of 1 A, the power dissipated $P_d$ by the pass device 136 is much higher than 1 W (2.6 W) and so the second error signal reaches the level (Step 402) sufficient to cause the second NMOS FET 252 to limit (Step 404) the PNP drive current to about 1 mA and hence the charging current, $I_{ch}$, to about 100 mA, thereby reducing the power dissipated, $P_d$, by the pass device 136 to a maximum of 1 W. Hence, it can be seen that the above described circuit limits the power dissipated, $P_d$, by the pass device 136 to a safe maximum value, in this example 1 W.

The above examples related to initial parameters. However, as the charging of the battery 106 progresses, the voltage across the battery 106 rises. In a fourth example (FIG. 6) of the adapter 102, the supply rail 116 is at 11V, the resistance $R_{plug}$ of the adapter 102 is 6Ω and the initial charge voltage across the battery 106 is 3V. These initial parameters result in a fourth charging current curve 600 and a fourth power dissipation curve 602 for the power, $P_d$, dissipated by the pass device 136. However, as the current flowing through the pass device 136 increases to 1 A, the first error signal begins to reach the level (Step 400) mentioned above that is sufficient to cause the first NMOS FET 238 to limit the drive current, thereby limiting the charging current flowing through the pass device 136 to no more than the first predetermined threshold current of 1 A. At this point, the power being dissipated by the pass device 136 is 1.6 W and so, when the first error signal dictates the charging current to be the maximum of 1 A, the power dissipated, $P_d$, by the pass device 136 is higher than 1 W (1.6 W) and so the second error signal reaches the level (Step 402) sufficient to cause the second NMOS FET 252 to limit (Step 404) the PNP drive current to about 1 mA and hence the charging current to about 100 mA, thereby reducing the power dissipated, $P_d$, by the pass device 136 to a maximum of 1 W.

Figure 6:
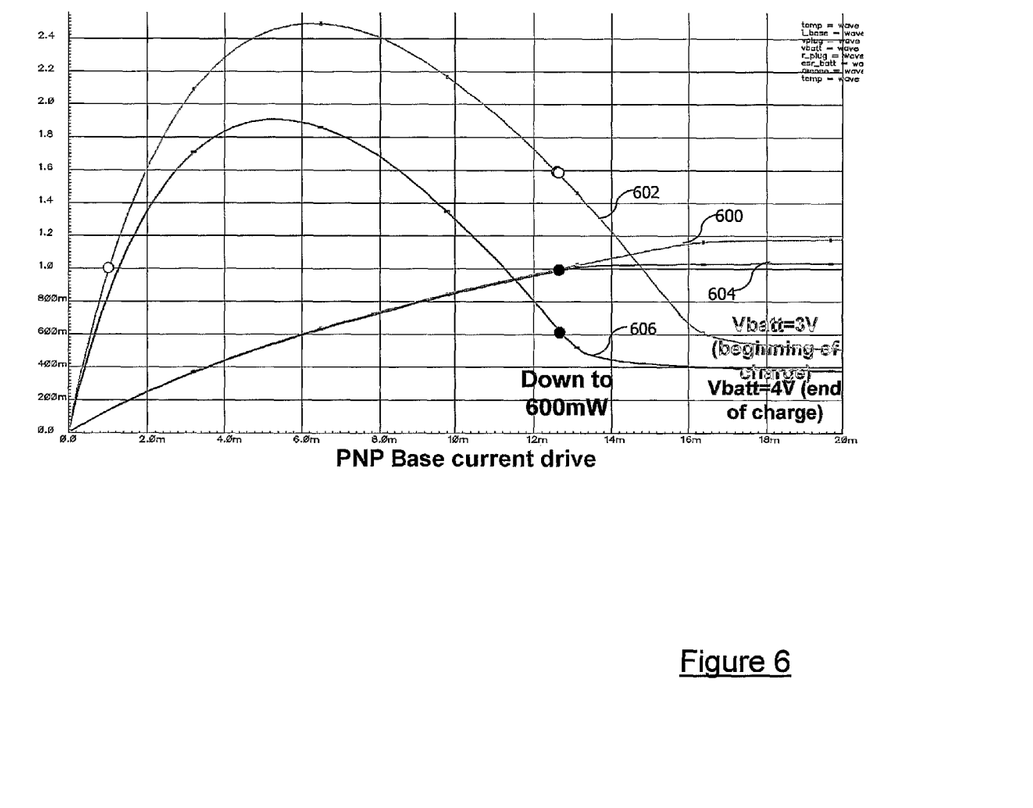
FIG. 6 is a graph of power dissipation curves and charge current curves for a single voltage source used, but at two different times.

As the charging of the battery 106 progresses the voltage across the battery 106 increases and hence the fourth charging current curve 600 and the fourth power dissipation curve 602 change. Near the end of the charging cycle, a fifth charging current curve 604 and a fifth power dissipation curve 606 are respectively followed. In this respect, the first error signal would still causes the first NMOS FET 238 to limit (Step 400) the drive current to about 12.5 mA and hence the charging current flowing through the pass device 136 to no more than 1 A. However, the power dissipation characteristic of the pass device 136 shifts downwards, resulting in the pass device 136 dissipating less power when the charging current is 1 A. Consequently, the second predetermined threshold power dissipation of 1 W is no longer reached and the charging system has a refresh mechanism (Step 406) to ensure that the highest permissible charging current is flowing through the pass device 136 whilst maintaining the power dissipated, $P_d$, by the pass device to below the predetermined power dissipation threshold.

Therefore, in another embodiment, the charging system 104, through the use of the first error signal ensures that the charging current flowing through the pass device 136 is at the predetermined threshold charging current (step 400). Then, using the second error signal, the charging system 104 ensures that the power dissipated by the pass device 136 does not exceed (Step 402) the predetermined power dissipation threshold. Provided the predetermined power dissipation threshold is not exceeded, the charging current remains at the predetermined threshold charging current. However, as soon as the predetermined power dissipation threshold is exceeded, through use of the second error signal the second error signal causes the charging current to reduce (Step 404) to a value low enough to ensure the predetermined power dissipation threshold is no longer exceeded, whilst maintaining the charging current at as high a value as possible within the constraint of the predetermined power dissipation threshold. However, as mentioned above, as the charging cycle progresses the voltage across the battery 106 increases and so the charging conditions change as well. Consequently, the counter 206 of the controller 208 periodically disables (Step 406) the power sensing circuit 212 for a predetermined temporary period of time, for example a disabling period of 10 μs every 1 s, but not so long so as to cause damage to the pass device 136 through excessive power dissipated by the pass device 136. When this happens, the drive current is controlled only by the first error signal and hence the charging system 104 causes the charging current, $I_{ch}$, flowing through the pass device 136 to return to the predetermined threshold charging current irrespective of the power dissipated, $P_d$, by the pass device 136. Subsequently, control by the power sensing circuit 212 is reinstated after the predetermined temporary period of time and, through use of the second error signal, the power sensing circuit 212 reduces the drive current to the pass device 136 to a safe level that is not more than the predetermined power dissipation threshold. Consequently, as the charging current and power dissipation characteristics of the pass device change during the charging cycle, the charging current is always maintained at a maximum possible value whilst the predetermined power dissipation threshold is not exceeded, thereby ensuring an optimum safe charge time.

Consequently, returning to the fifth power dissipation curve 606, whilst the first error signal limits the charging current flowing through the pass device 136 to no more than 1 A, the second error signal does not reach a level sufficient to cause the second NMOS FET 252 to limit the drive current further; the drive current of about 12.5 mA set by the first NMOS FET 238 therefore remains unchanged and the power dissipated, $P_d$, by the pass device 136 remains at the reduced level of 600 mW.

Hence it can be seen that through controlling a first switching device coupled in series with a second switching device for charging current limitation, the first switching device can be used to provide additional control of the drive current controlling the pass device so as to ensure that the pass device does not dissipate power in excess of the predetermined threshold power dissipation level.

Whilst in the above example, the power sensing circuit 212 has been disabled, for example by a disabling PMOS FET 700 (FIG. 7), it will be apparent to the skilled person that any other suitable know technique for temporarily permitting the predetermined power dissipation threshold to be exceeded for the predetermined period of time can be employed.

It should be appreciated that although the above described example relates to the field of battery charging, the principles behind the above examples can be used in other applications, for example in relation to voltage regulator circuits, audio amplifier circuits, or any circuit that requires a pass device which may dissipate more power than it can withstand due to the supply of an unknown power source level to the pass device.

It is thus possible to provide a control apparatus and a method of regulating power that performs real-time and accurate power dissipation calculations. The apparatus has a lower Bill Of Materials (BOM) cost, uses small and Low cost PNP transistor. Additionally, a low-cost unregulated adapter can be used with a charging system comprising the control apparatus. Further, the need for pass device temperature monitoring is no longer necessary. Also, the time taken to charge a battery is optimised and is maximised with respect to permissible power dissipation by the pass device. Another benefit is that the lifetime of the pass device is not curtailed through excessive power dissipation by the charge device.

The invention claimed is:

1. An apparatus comprising:
   a pass device including an input for receiving power from
      a power supply, and
      an output for supplying power to a load; and
   a control apparatus for controlling the pass device, the control apparatus including;
      a current control circuit arranged to generate a first control signal for limiting to a predetermined current level current flowing through the pass device; and
      a power control circuit arranged to generate a second control signal, in response to being enabled, to control power dissipated by the pass device below a predetermined power dissipation level, wherein the power control circuit is to be temporarily disabled, for a predetermined period of time, in response to the power dissipated while the power control circuit is enabled being below the predetermined power dissipation level, wherein the predetermined period of time conforms to a predetermined frequency of occurrence.

2. An apparatus as claimed in claim 1, wherein the current control circuit generates the first control signal for driving the pass device in a linear regime thereof.

3. An apparatus as claimed in claim 2, wherein the power control circuit generates the second control signal for limiting current flowing through the pass device.

4. An apparatus as claimed in claim 2, wherein the power control circuit generates the second control signal independently of the first control signal.

5. An apparatus as claimed in claim 2, wherein the power control circuit is arranged, when in use, to permit temporarily the predetermined power dissipation level to be exceeded for the predetermined period of time.

6. An apparatus as claimed in claim 1, wherein the power control circuit generates the second control signal for limiting current flowing through the pass device.

7. An apparatus as claimed in claim 6, wherein the power control circuit is arranged, when in use, to permit temporarily the predetermined power dissipation level to be exceeded for the predetermined period of time.

8. An apparatus as claimed in claim 1, wherein the power control circuit generates the second control signal independently of the first control signal.

9. An apparatus as claimed in claim 8, wherein the power control circuit is arranged, when in use, to permit temporarily the predetermined power dissipation level to be exceeded for the predetermined period of time.

10. An apparatus as claimed in claim 1, wherein the power control circuit is arranged to permit temporarily the predetermined power dissipation level to be exceeded for the predetermined period of time.

11. An apparatus as claimed in claim 10, wherein the predetermined power dissipation level is permitted to be exceeded at predetermined times.

12. An apparatus as claimed in claim 10, wherein the load is a rechargeable cell.

13. An apparatus as claimed in claim 1, wherein the power control circuit is arranged to be temporarily disabled at predetermined times.

14. An apparatus as claimed in claim 1, wherein the load is a rechargeable cell.

15. A method of regulating power in a circuit comprising a pass device for coupling a power source to a load, the method comprising the steps of:
   measuring power dissipated by the pass device;
   controlling current flowing through the pass device, using a power control circuit, in response to the power control circuit being enabled and in response to the measured power dissipation so as to limit the power dissipation by the pass device below a predetermined power dissipation level; and
   temporarily disabling the power control circuit to allow the power dissipated to exceed the predetermined power dissipation level for a predetermined period of time in response to the measured power dissipation while the power control circuit is enabled being below the predetermined power dissipation level, wherein the predetermined period of time conforms to a predetermined frequency of occurrence.

16. A method as claimed in claim 15, further comprising the steps of:
   measuring current flowing through the pass device; and
   controlling the current flowing through the pass device in response to the measured current so as to limit the current flowing through the pass device to a predetermined current level.

17. A method of charging a cell comprising the steps of:
   coupling the power source to the load via a charging circuit; and
   regulating power in the circuit according to the method as claimed in claim 16.

18. A method of charging a cell comprising the steps of:
   coupling the power source to the load via a charging circuit; and
   regulating power in the circuit according to the method as claimed in claim 15.

* * * * *